United States Patent [19]

Heubusch

[11] Patent Number: 4,484,961
[45] Date of Patent: Nov. 27, 1984

[54] PREPARATION AND PURIFICATION OF $N_2O_4$ CONTAINING ROCKET PROPELLANT OXIDIZER

[75] Inventor: Henry P. Heubusch, Buffalo, N.Y.
[73] Assignee: Textron, Inc., Providence, R.I.
[21] Appl. No.: 314,701
[22] Filed: Oct. 26, 1981
[51] Int. Cl.³ .............................................. C06B 47/04
[52] U.S. Cl. ....................................... 149/74; 60/214; 210/737
[58] Field of Search ............................ 60/214; 149/74; 210/737

[56] References Cited

U.S. PATENT DOCUMENTS

| | | | |
|---|---|---|---|
| 2,355,817 | 8/1944 | Morrow | 52/5 |
| 3,507,717 | 4/1970 | Dubb et al. | 179/74 |
| 3,534,554 | 10/1970 | Allan et al. | 60/214 |
| 3,536,543 | 10/1970 | Hess | 149/74 |
| 4,144,092 | 3/1979 | Krepler | 210/737 |

OTHER PUBLICATIONS

Wright, "Nitric Acid/Nitrogen Tetroxide Oxidizers", vol. II of USAF Propellant Handbooks, AFRPL–TR–76, pp. 1–7, 2.3–1, 2.3–1.5, 3–(26–28), 3–(32–33), 3–(40–41), 3–45, (Feb. 1977).
Addison, "Flow Decay" (Final Scientific Report), AFRPL–72–84, pp. (Summary), 101–104, 109, 115–117, 120–124, 126, 132, 133, 135, 136, 139, (6–1962).
Sinor et al., "$N_2O_4$/IRFNA Conference, Abstracts and Slides", pp. iii–iv, 7–14, and 41–45, CPIA Publ. No. 171, (Jul. 1968).

*Primary Examiner*—Edward A. Miller
*Attorney, Agent, or Firm*—Bean, Kauffman & Bean

[57] ABSTRACT

There is disclosed a process and apparatus whereby typically furnished commercially nitrogen tetroxide propellants for rocket engines may be upgraded to decrease flow decay problems and to increase the shelf life of the product; thereby providing for longer duration trouble-free rocket engine performance. The raw MON material is initially converted if necessary to the "Red" type; dissolved iron salts and other dirt particulates are removed by cooling and filtering, and thenceforth throughout the process the material is filtered at each transfer operation. Specific apparatus arrangements are provided for facilitating the process and the end product is of increased purity; whereby upon being furnished to an engine for test or vehicle launching purposes the program may proceed as scheduled and the vehicle may be maintained in space for a longer period of time.

14 Claims, 5 Drawing Figures

SOLUBILITY OF CORROSION PRODUCTS
AS A FUNCTION OF NITRIC OXIDE CONTENT

SOLUBILITY OF CORROSION PRODUCTS
AS A FUNCTION OF PROPELLANT TEMPERATURE

PREPARATION AND PURIFICATION OF $N_2O_4$ CONTAINING ROCKET PROPELLANT OXIDIZER

BACKGROUND OF THE INVENTION

It is apparent that a need exists for supply of improved grades of nitrogen tetroxide propellants for use as oxidizers for rocket engines during system design and development tests and at the launching sites of vehicles to be projected into space, such as satellites, space shuttles, or the like. Propellant supply/oxidizer flow rate decay problems such as are prone to interfere with design/testing programs and launch scheduling of the vehicle, as well as to its space flight life duration prospects have plagued the industry. For example, the following publications report on current state of the art:

"Flow Decay in Nitrogen Tetroxide Systems", a report published at pages 7–14 of Chemical Propulsion Information Agency Publication No. 171, July 1968.

"Operational Nitrogen Tetroxide Handling", a report published at pages 41–45 of Chemical Propulsion Information Agency Publication No. 171, July 1968.

"Nitric Acid/Nitrogen Tetroxide Oxidizers", pages 2.3-1, 2.3-15, 3-26, 3-27, 3-28, 3-32, 3-33, 3-40, 3-41 and 3-45 of USAF Propellant Handbooks, Vol. II, AFRPL-TR-76-76, February 1977.

"Flow Decay", pages 101, 103, 104, 115, 117, 122, 124, 126, 132, 133, 135, 136 and 139 of Final Scientific Report, June 30, 1972, AFRPL-TR-72-84.

As a result of a professional search conducted with respect to this invention, Applicant is aware of the following U.S. Pat. Nos.: 2,298,255; 2,355,817, 2,403,932; 2,759,418; 3,095,693; 3,146,139; 3,310,444; 3,345,821; 3,383,859; 3,534,554; 3,536,543; 3,562,035; and 3,582,412. None of these references is considered relevant to the subject matter claimed herein.

Such problems are now of major concern due to the recent emergence of nitrogen tetroxide propellants as major oxidizers for liquid propellant rocket engines of such vehicles, and occur in connection with the storing, transferring, testing, launching and maneuvering operations of satellites; MX missiles; space shuttles; and the like. This is because of the tendency of such oxidizers to corrode their storage/transport/transfer containers; as well as other steel parts of the engine oxidizer supply system. Commercially available nitrogen tetroxide propellants for such purposes are typically supplied to the test site or launch-pad-mounted vehicle, either into the vehicle inboard supply tanks or into close-by "ready storage" ground-based intermediary supply relay tanks.

In either case, the supplied nitrogen tetroxide tends to react with the metal of the container and of the system components so as to cause solid precipitates of iron salts to form therefrom. Such solids in the supply stream, along with other "dirt" particulates such as are typically present in commercially supplied nitrogen tetroxide propellants, tend to plug the filters and other components of the propulsion system such as valves and injector orifices; thereby seriously interfering with the propellant transfer operations as well as the test or vehicle launching operations. Furthermore, and perhaps more importantly, the incidence thereof seriously reduces the reliable duration prospect of the rocket engine performance. Typical pre-storage and transfer/operational ambient temperature conditions contribute to these problems.

SUMMARY OF THE INVENTION

I have observed that a supply of relatively warm/hot nitrogen tetroxide propellant such as is typically furnished commercially to a test site or to a space vehicle at the launch site, precipitates solid particulates out of solution at progressive rates as it cools down throughout the supply transfer process. This problem is exaggerated whenever the supply is furnished from a ground-based stock after long term storage such as in stockpiling operations; and in any case operates to plague the engine test and/or vehicle launch control operations, as well as to limit the duration of the ensuing mission in space. This invention is concerned with the problem of more precisely furnishing to a propulsion system test facility and/or to a facility for launching a vehicle such as a satellite or the like into space in accordance with a prescribed test or launching program a more reliable propellant supply. Thus, the end-user vehicle may be maintained in space for a longer period of time than has heretofore been possible when using present day commercial grades of "Red" or "Green" nitrogen tetroxide (MON). The terms "Red" and "Green" MON as used herein refer to propellants as set forth in Military Procurement Specification MIL-P-26539C.

Table I from such Mil. Spec. and which specifies chemical composition and physical properties is reproduced as follows:

| Composition | NTO (Red-Brown) | Limits MON-1 (Green) | MON-3 (Green) | Test Paragraphs |
|---|---|---|---|---|
| Nitrogen tetroxide assay ($N_2O_4$)-percent by weight | 99.5 | | | 4.5.3 |
| Nitric oxide (NO) content-max percent by weight - min | [1] | 1.0 0.6 | 3.0 1.5 | 4.5.2 |
| $N_2O_4$ + NO - percent by weight minimum | | 99.5 | 99.5 | 4.5.3 |
| Water equivalent - percent by weight maximum | 0.17 | 0.17 | 0.17 | 4.5.4 |
| Chloride content - percent by weight maximum | 0.040[2] | 0.040 | 0.040 | 4.5.5 |
| Particulate - mg/liter - max | 10 | 10 | 10 | 4.5.6 |

[1] The NO content shall be limited to that which does not change the specified Red-Brown color of the propellant (3.4).
[2] This test need not be performed on NTO propellant if the material was manufactured by the ammonia-oxidation process.

More specifically, in accordance with the present invention, the type of propellant being commercially furnished, whether it is "Red" or "Green", is first determined by appropriate analysis. If it is of the "Green" type, an excess of oxygen is added to it in order to convert it to the "Red" type for introduction into the process of the present invention. Then, in any case, the dissolved iron salts included in the propellant supply resulting from previous contact of the propellant with the steel components of the manufacturing, storing and/or manufacturing equipment are precipitated out of solution by reducing the temperature of the solution to within the range of +20° F. to +35° F. The referred to precipitates (as well as other "dirt" particulates such as typically occur in commercially furnished grades of nitrogen tetroxide supplies) are then filtered out so as to thereby provide to the test or launch site a more pure form of "Red" nitrogen tetroxide propellant. This improved propellant eliminates at minimum expense the currently frustrating problems of design modifications and of scheduling blast-off procedures. This product may be used "as is" for fueling engines of the type such as are used for example in the TITAN II missiles; or it may be blended to contain for example from 0.6 to 1.0 wt% nitric oxide (NO) to produce a purer "MON-1" type propellant; such as is used in MX type engines. Or, it may be blended with 1.5 to 3.0 wt% nitric oxide to produce a purer "MON-3" type propellant such as is used in the space shuttle engines, as well as in various bi-propellant satellite engines. Various amounts of nitric oxide may be added to the base material in similar manner in accordance with this invention in order to produce propellants such as may be required for other applications.

Thus, the invention provides an improved base material from which may be blended any desired formulations of nitrogen tetroxide rocket engine oxidizers, which are in any case of improved purity when supplied to the propulsion system; thereby substantially increasing the operational duration functioning of such engines by reason that the propellant flow rate decay problems are reduced. This advance in the art is acquired without adding foreign matter "inhibitors" or the like, such as are suggested for example in U.S. Pat. Nos. 2,403,932; 3,534,554 and 3,536,543.

DESCRIPTION OF PREFERRED EMBODIMENTS

Figure 1:
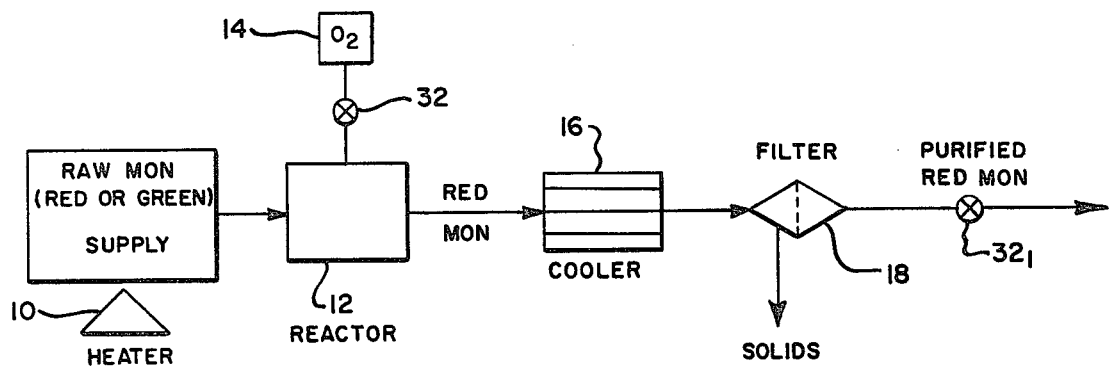
FIG. 1 is a flow diagram illustrating a first stage of the invention, wherein a "raw" (commercial grade) of MON is beneficiated before proceeding further in accordance with the process of the invention.

In accordance with one preferred version of this invention as shown at FIG. 1, a typical commercially supplied raw MON, such as may be in the form of either the so-called "Red" or "Green" type, may first be heated as is indicated at 10 if necessary to bring it into liquid state. For example, the MON may be supplied in containers under lower than 12° F. ambient temperature conditions, thereby being in frozen solid condition. The liquid MON is then transferred into a reactor 12 and in event the raw MON material if of the "Green" type, an excess of oxygen gas is bled into the MON, such as from a supply tank 14 under control of valve 32. Accordingly, in any event the output from the vessel 12 is assured to be MON of the "Red" type. This is then beneficiated by cooling it down to within the range of $+20°$ F. to $+35°$ F. such as by passing it through a cooler as is shown at 16. Then it is filtered through a suitable device as is indicated at 18. This filter should be at least of a rating such as is known in the trade as "6 microns absolute"; meaning that the largest particle passing through the filter will be of the order of 6 microns. If possible, a still finer filter will be employed. Thus, the solid precipitates which occur in the "Red" MON in the form of iron salts or the like resulting from previous contact with the walls of its containers are removed, as well as any other so-called "dirt" particles such as may have accumulated therein throughout its manufacture, transfer/storage procedures.

Figure 2:
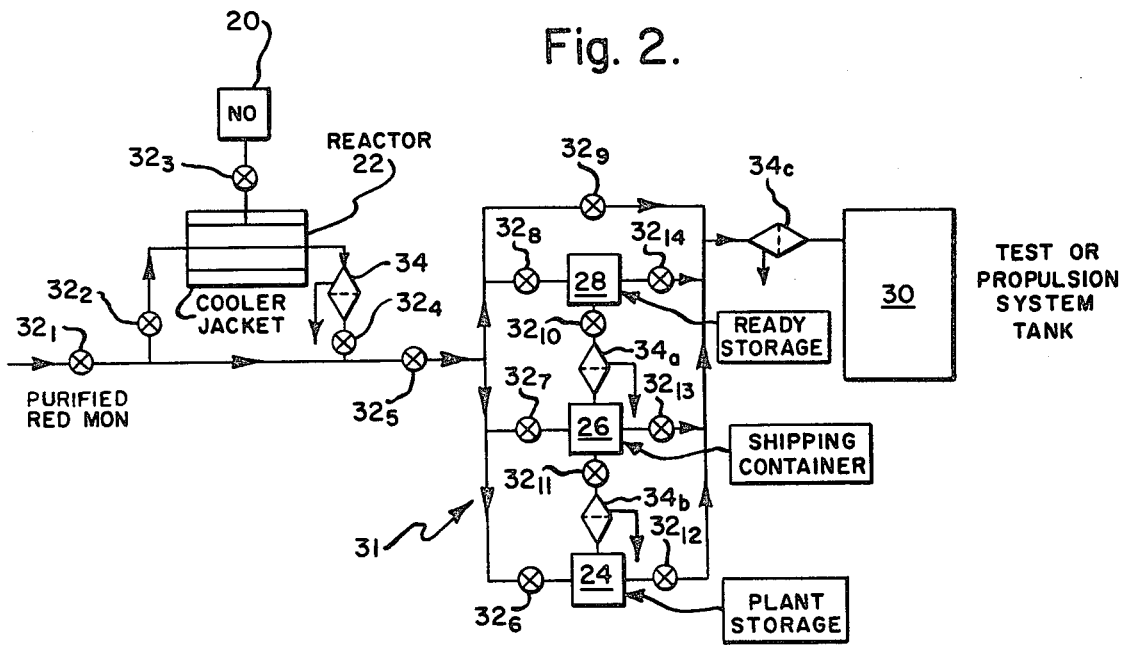
FIG. 2 is a flow diagram showing optional treatments of the beneficiated material to be processed, as well as placements of typical flow control valves and filters in the system.

A purer form of "Red" nitrogen tetroxide is thereby provided under delivery control by a valve $32_1$, from which supplies of MON-1; MON-3, etc. may be formulated by by-passing it under control of a valve $32_2$ for addition of appropriate amounts of NO gas under control of a valve $32_3$ such as from a supply source indicated at 20 leading into a reactor as shown at 22 (FIG. 2). Provision is made for cooling the reactor prior to admission of NO gas in order to obtain an efficient reaction between the NO and dissolved oxygen ($O_2$) and nitrogen dioxide ($NO_2$) present in the purified "Red" MON; and a filter such as shown at 34 is provided downstream of the reactor to remove solid precipitates from the stream. Valves $32_4$ and $32_5$ are included in the delivery lines to cooperate with the valve $32_2$ to control the by-pass operation. Thus, the products delivered through valve $32_5$ are therefore initially substantially free of particulate inclusions such as would plug filters and/or feed system components in the rocket test or propulsion system; and therefore will exhibit longer shelf life and provide for longer duration trouble-free rocket engine test or engine performance.

In any case, in accordance with this invention, in order to obtain desirably extended shelf life and trouble-free rocket engine performance, nitric oxide is added to the product at this stage of the process, as allowed by procurement specifications. However, to be assured of maximum shelf life and trouble-free rocket engine performance, nitric oxide would be added at this stage up to the maximum amount permitted by procurement specifications. It will be recognized that this same process may be employed to rectify existing stock-piled supplies of nitrogen tetroxide propellants before they are released for use.

Figure 3:
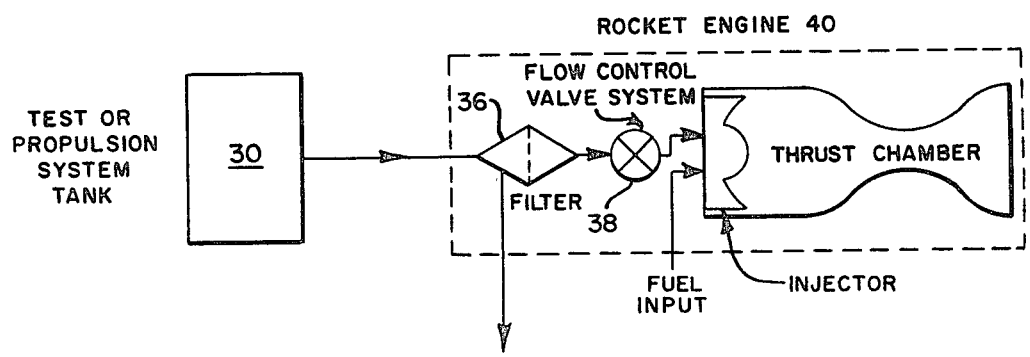
FIG. 3 is a flow diagram illustrating flow control valves and filter placements in that portion of the system which is located in a test facility or inboard of a space vehicle.

FIG. 2 also shows how the purified MON supply of the present invention may be furnished under control of a strategically placed conduit and valve system as designated generally at 31; whereby the purified propellant may be optionally transported either into a plant storage facility 24; a shipping container 26; a ready storage facility 28; or directly into the rocket engine test or propulsion system propellant feed tank 30 under control of a manifold system including valves $32_6$; $32_7$; $32_8$; $32_9$; $32_{10}$; $32_{11}$; $32_{12}$; $32_{13}$ and $32_{14}$. It is an important feature of this invention that appropriate filters are installed in this manifold circuitry such as are illustrated at $34a$, $34b$ and $34c$. Thus, it will be noted that the product is filtered after each cooling operation and after each transfer and storage step, as well as just prior to introduction into the test facility or propulsion system tank. FIG. 3 illustrates how the material is preferably filtered again at 36 just prior to its entry into the rocket engine flow control valve system as shown at 38 leading into the engine thrust chamber injector. It is to be noted that the filter 36 may preferably be of slightly larger pore size than the filter 18 and the 34 series of filters which are ground-based, and are therefore readily replaceable when becoming clogged. The rocket engine in toto is designated generally by the numeral 40.

Figure 4:
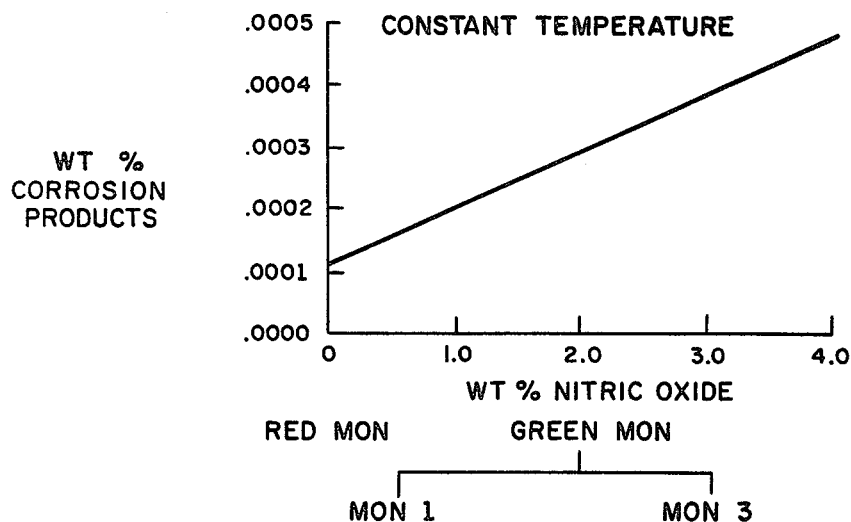
FIG. 4 graphically illustrates relative changes in solubility of corrosion products in nitrogen tetroxide propellants at constant temperature as a function of the nitric oxide content of various propellants.
Figure 5:
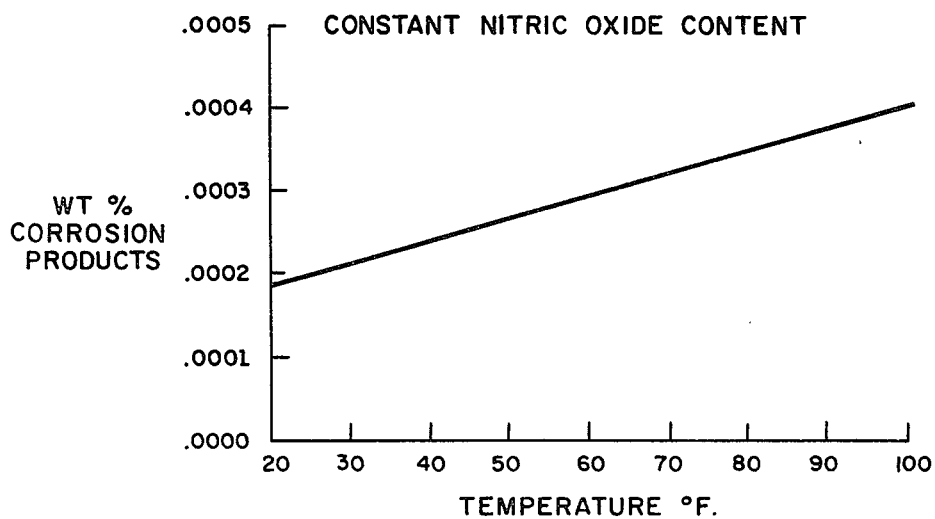
FIG. 5 similarly illustrates changes in solubility of corrosion products at constant nitric oxide content as a function of propellant temperature.

FIGS. 4 and 5 illustrate graphically how changes in solubility of corrosion products in nitrogen tetroxide propellants occur as functions of NO content and temperature. For example, FIG. 4 graphs typical solubility changes in relation to nitric oxide content, whereas FIG. 5 illustrates solubility changes in relation to temperature changes. Incidentally, just prior to initial loading an/or reloading of the tank and plumbing components of the propellant handling system, all parts thereof are preferably cleansed of any metal corrosion/oxidation by-products such as may exist on their propellant contacting surfaces. This may be done by flushing them with an appropriate cleaning solution. For example, components made of stainless steel may be "pickled" with an aqueous solution of nitric and hydrofluoric acids. Then, the cleansed surfaces are passivated such as with an aqueous nitric acid solution.

EXAMPLE #1

Approximately 200 grams of typically commercially furnished "Green" MON (mixed oxides of nitrogen containing an equilibrium amount of nitrogen dioxide and nitric oxide) were cooled down to a temperature of approximately 32° F. for beneficiation. A small quantity (approximately 50 grams) of the chilled material was then analyzed in order to determine its nitric oxide content. The remainder of the material was then weighed into a tared glass pressure vessel. The vessel and contents were then cooled to approximately 32° F. and contents bleached by bubbling an excess of commercially pure oxygen gas into the liquid, thus converting the nitric oxide present in the liquid to nitrogen tetroxide, according to the equation:

$$2NO + O_2 \rightarrow N_2O_4$$

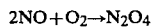

Addition of more than the stoichiometric amount of oxygen was then confirmed by analysis. The cooled product (*impure* "Red" MON) was then transferred by nitrogen gas pressure through a chilled plastic filter assembly rated at 6 microns absolute, into a clean, chilled glass receiver. This product was *pure* "Red" MON, which by analysis substantially exceeded the requirements for "Red-Brown" propellant as set forth in Military Procurement Specification, MIL-P-26539C.

EXAMPLE #2

100 grams of "Red" MON (mixed oxides of nitrogen) as received from a plant which commercially produces a mixture of nitrogen tetroxide containing an equilibrium amount of nitrogen dioxide and dissolved oxygen, was cooled down to 32° F. and then passed by nitrogen gas pressure through a chilled plastic filter assembly rated at 6 microns absolute into a clean, chilled glass receiver. The product was pure "Red" MON, which by analysis exceeded the requirements for "Red-Brown" nitrogen tetroxide type propellant as set forth in Military Procurement Specification MIL-P-26539C.

EXAMPLE #3

A quantity of pure "Red" MON, as produced in Example 1 or Example 2, was cooled down to 32° F. and then transferred into a glass pressure vessel. The vessel was weighed before and after charging. The vessel and contents were then again cooled down to 32° F. Commercially pure nitric oxide was then bubbled into the liquid to convert any excess oxygen into nitrogen tetroxide, and to convert some of the nitrogen dioxide present to dinitrogen trioxide according to the equation:

$$NO + NO_2 \rightarrow N_2O_3$$

Addition of the nitric oxide was monitored by weight change and terminated when analysis confirmed the desired degree of dinitrogen trioxide formation. The method of analysis employed is provided in Military Procurement Specification MIL-P-26539C. The product was pure "Green" MON containing the equivalent of 0.6-1.0 wt% nitric oxide, therefore exceeding the purity of the MON-1 required in the aforementioned Military Procurement Specification.

EXAMPLE #4

Approximately 100 grams of the product obtained in Example 3 was furnished additional nitric oxide as in Example 3, so that sufficient nitric oxide was added so as to produce a final value equivalent to 1.5-3.0 wt% nitric oxide. The final product was a pure grade of MON-3 propellant exceeding the requirements of Military Procurement Specification MIL-P-26539C.

I claim:

1. In the process of supplying liquid nitrogen tetroxide propellant to a rocket engine, the steps of:
   (a) providing a supply of liquid nitrogen tetroxide propellant which is contaminated by iron salts which are increasingly soluble in the propellant both as temperature and the concentration of NO increase and which propellant consists essentially of a mixture of $NO_2$ and $N_2O_4$ in equilibrium and including dissolved $O_2$ so that the mixture is free of NO;
   (b) adjusting and maintaining the temperature of the propellant supply of step (a) to a temperature in the range 20° to 35° F. to precipitate dissolved iron salts therefrom and filtering the propellant supply while at said temperature to remove particles including precipitated iron salts at least larger than in the order of six microns; and
   (c) recovering the filtered propellant supply of step (b) for delivery to a rocket engine.

2. The method as defined in claim 1 wherein the supply of propellant provided in step (a) is obtained by adding oxygen to a liquid nitrogen tetroxide propellant which contains NO, the oxygen being added in amount in excess of that required to convert said NO to $NO_2$.

3. The method as defined in claim 1 including the step of:
   passing nitric oxide through the filtered propellant supply recovered in step (c) in amount sufficient to provide a liquid nitrogen tetroxide propellant containing NO.

4. The method as defined in claim 2 including the step of:
   passing nitric oxide through the filtered propellant supply recovered in step (c) in amount sufficient to provide a liquid nitrogen tetroxide propellant containing NO.

5. The process for furnishing a liquid nitrogen tetroxide propellant to the fill line of a rocket engine, said process comprising:

(a) providing a supply of liquid nitrogen tetroxide propellant which is contaminated by iron salts which are increasingly soluble in the propellant both as temperature and the concentration of NO increase and which propellant consists essentially of a mixture of $NO_2$ and $N_2O_4$ in equilibrium and including dissolved $O_2$ so that the mixture is free of NO and then upgrading said supply of propellant by:

(i) adjusting and maintaining the temperature of the propellant supply without freezing thereof to a temperature effective to precipitate dissolved iron salts therefrom; and (ii) filtering said propellant supply while its temperature is adjusted and maintained as in (i) to remove said precipitated iron salts therefrom; and (b) delivering the filtrate to a rocket engine supply facility for delivery to said fill line.

6. The process as defined in claim 5 wherein the propellant provided in step (a) is obtained by adding oxygen to a liquid nitrogen tetroxide propellant which contains NO, the oxygen being added in amount in excess of that required to convert said NO to $NO_2$.

7. The method as defined in claim 5 including the step of:

passing nitric oxide through said filtrate in amount sufficient to provide a propellant containing NO and having a green color.

8. The method as defined in claim 6 including the step of:

passing nitric oxide through said filtrate in amount sufficient to provide a propellant containing NO and having a green color.

9. The method of reducing flow decay associated with feeding liquid nitrogen tetroxide contaminated with iron salts to a rocket engine, which comprises the steps of:

(a) converting a supply of liquid nitrogen tetroxide propellant which is contaminated by iron salts which are increasingly soluble in the propellant as temperature and as concentration of NO increase, and which supply contains NO, to a propellant liquid having a red color due to the absence of NO and the presence of dissolved $O_2$ by adding $O_2$ to said supply in amount in excess of that required to convert all of said NO contained in the supply to $NO_2$ so that the propellant of red color consists essentially of an equilibrium mixture of $NO_2$ and $N_2O_4$ including dissolved $O_2$ so that the mixture is free of NO;

(b) filtering the red propellant liquid obtained in step (a) while adjusting and maintaining the temperature thereof to assure the presence of precipitated iron salts from the propellant and to remove particulates including the precipitated iron salts of a size greater than about six microns; and (c) supplying a rocket engine with the filtrate of step (b).

10. The method of claim 9 including the step of adding NO to the filtrate of step (b) in amount sufficient to convert said dissolved $O_2$ into nitrogen tetroxide and to impart a green color to said filtrate.

11. The method of supplying a liquid nitrogen tetroxide propellant for rocket engines which comprises the steps of:

(a) providing a liquid propellant supply which is contaminated by iron salts which are increasingly soluble in the propellant both as temperature and the concentration of NO increase and which propellant consists essentially of an equilibrium mixture of $NO_2$ and $N_2O_4$ with dissolved $O_2$ so that the liquid does not contain NO and is of red color;

(b) filtering said liquid propellant supply while at a temperature effective to precipitate iron salts therefrom to remove particulate material including such precipitate having a size greater than about six microns; and thereafter (c) adding NO to the filtrate of step (b) in amount sufficient to impart green color to said filtrate; and (d) fueling a rocket engine with said filtrate of step (c).

12. The method as defined in claim 11 wherein the liquid propellant provided in step (a) is obtained from a supply of liquid propellant which consists essentially of an equilibrium mixture of $NO_2$ and $NO_4$ and a minor amount of NO in the absence of dissolved $O_2$ and which is of green color, the green-colored supply being converted to the red-colored propellant by adding an amount of oxygen thereto in excess of that amount required to convert said minor amount of NO to $NO_2$.

13. The method of reducing flow decay associated with feeding liquid nitrogen tetroxide propellant contaminated with iron salts to a rocket engine, which comprises the steps of:

(a) converting a supply of liquid nitrogen tetroxide propellant, containing NO and which is contaminated by iron salts which are increasingly soluble in the propellant both as temperature and the concentration of NO increase, into a propellant liquid having a red color due to the absence of NO and the presence of dissolved $O_2$;

(b) filtering the red propellant liquid of step (a) while at a temperature effective to precipitate iron salts therefrom to remove particulates including such precipitate of a size greater than about six microns and recovering the filtrate; and (c) supplying a rocket engine with the filtrate recovered in step (b).

14. The method as defined in claim 13 including the step of adding NO to the filtrate recovered in step (b) in amount sufficient to convert said dissolved $O_2$ into nitrogen tetroxide and to impart a green color to said filtrate.

* * * * *